(12) United States Patent
Erdmann et al.

(10) Patent No.: US 9,253,707 B2
(45) Date of Patent: Feb. 2, 2016

(54) NETWORK INTERFACE UNIT FOR A NODE IN A WIRELESS MULTI-HOP NETWORK, AND A METHOD OF ESTABLISHING A NETWORK PATH BETWEEN NODES IN A WIRELESS MULTI-HOP NETWORK

(75) Inventors: Bozena Erdmann, Aachen (DE); Armand Michel Marie Lelkens, Heerlen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 755 days.

(21) Appl. No.: 12/993,872

(22) PCT Filed: May 27, 2009

(86) PCT No.: PCT/IB2009/052230
§ 371 (c)(1),
(2), (4) Date: Nov. 22, 2010

(87) PCT Pub. No.: WO2009/147585
PCT Pub. Date: Dec. 10, 2009

(65) Prior Publication Data
US 2011/0069665 A1    Mar. 24, 2011

(30) Foreign Application Priority Data
Jun. 4, 2008    (EP) .................................... 08104254

(51) Int. Cl.
| H04B 7/14 | (2006.01) |
| H04W 40/24 | (2009.01) |
| H04L 12/761 | (2013.01) |
| H04L 12/721 | (2013.01) |

(52) U.S. Cl.
CPC ............. *H04W 40/246* (2013.01); *H04L 45/16* (2013.01); *H04L 45/26* (2013.01)

(58) Field of Classification Search
CPC ............... H04W 40/02–40/22; H04W 28/021; H04W 84/18–84/22
USPC .................................................. 370/310–350
See application file for complete search history.

(56) References Cited

U.S. PATENT DOCUMENTS 8,014,370 B2 *  9/2011  Banerjea et al. ............... 370/338
2004/0076158 A1  4/2004  Okubo
(Continued)

FOREIGN PATENT DOCUMENTS

| WO | 2005062553 A1 | 7/2005 |
| WO | 2005104458 A1 | 11/2005 |
| WO | 2007055689    | 5/2007 |

OTHER PUBLICATIONS

Oberg et al: "Efficient Flooding Protocols and Energy Models for Wireless Sensor Networks"; Linkoping Studies in Science and Technology, Thesis No. 1334, LIU-TEK-LIC-2007:43, Nov. 2007, pp. 84-109, 112.

*Primary Examiner* — Andrew Chriss
*Assistant Examiner* — Kenan Cehic (57) ABSTRACT

The invention describes a network interface unit (10) for a node (D, D 1, D 2, D 3, D a, D b, D c) in a wireless multi-hop network (WN) comprising a plurality of nodes (D, D 1, D 2, D 3, D a, D b, D c) that can be connected by means of network paths between source nodes and destination nodes, which network interface unit (10) comprises a multiple route request assembly module (11) for assembling a multiple route request message (MREQ) such that the multiple route request message (MREQ) of a source node (D) includes a plurality of addresses (41, 43, 45) for specific multiple destination nodes (D 1, D 2, D 3) to which network paths are to be established. The network interface (10) further comprises a transmit unit (12) for transmitting the message (MREQ) to other nodes (D 1, D 2, D 3, D a, D b, D c) in the wireless multi-hop network (WN). The invention also describes a method of establishing a network path between a source node (D) and multiple destination nodes (D 1, D 2, D 3) in a wireless multi-hop network (WN) using such a network interface unit (10).

10 Claims, 7 Drawing Sheets

(56) References Cited

U.S. PATENT DOCUMENTS

| | | |
|---|---|---|
| 2004/0165532 A1 | 8/2004 | Poor et al. |
| 2004/0233882 A1* | 11/2004 | Park et al. ............... 370/338 |
| 2005/0135379 A1 | 6/2005 | Callaway, Jr. et al. |
| 2005/0180447 A1 | 8/2005 | Lim |
| 2007/0041345 A1 | 2/2007 | Yarvis et al. |
| 2007/0177511 A1 | 8/2007 | Das et al. |
| 2011/0280246 A1* | 11/2011 | Isozu ............... 370/400 |
| 2012/0224508 A1* | 9/2012 | Kobayashi ............... 370/254 |

\* cited by examiner

| Broadcast radius | nwk Route Discovery Time [ms] | nwk Broadcast Delivery Time [ms] |
|---|---|---|
| 2 | 625 | 1000 |
| 4 | 1250 | 1600 |
| 8 | 2500 | 2100 |
| 16 | 5000 | 2600 |
| 32 | 10000 | 3000 |

FIG. 6

NETWORK INTERFACE UNIT FOR A NODE IN A WIRELESS MULTI-HOP NETWORK, AND A METHOD OF ESTABLISHING A NETWORK PATH BETWEEN NODES IN A WIRELESS MULTI-HOP NETWORK

FIELD OF THE INVENTION

The invention describes a network interface unit for a node in a wireless multi-hop, preferably mesh, network, and a method of establishing a network path between nodes in a wireless multi-hop network, preferably in a ZigBee network.

BACKGROUND OF THE INVENTION

Multi-hop networks that act in a self-organising manner are finding application in many fields such as industrial control, building automation, embedded sensing, etc. Devices in the network communicate with each other in a wireless manner, using low-power, low-cost radio. This allows more freedom in positioning the devices, since a mains connection is not required for the wireless inter-device communication.

A standard for wireless control of such networks, rapidly becoming established, is the ZigBee standard developed by the ZigBee Alliance. The ZigBee standard describes high-level communication between devices using low-power digital radios, and is based on the IEEE 802.15.4 standard, which in turn specifies the Physical (PHY) layer and the Medium Access (MAC) layer for wireless personal area networks (WPANs).

An example of a multi-hop network might be a building automation network with various types of devices such as lamps, switches, ventilators, motion sensors, etc. These devices, each of which is a network 'node' (i.e. is equipped with a wireless interface), can organise themselves into a network with one device acting as the coordinator, and all other devices being either 'routers' or 'end devices'. A router can, in contrast to an end device, pass messages from one node to another, acting as an intermediate node. For example, a number of lamps in a room can be end-devices, controlled by a switch with router capability.

Devices or nodes in such a wireless network communicate by exchanging messages or network commands in the form of frames. The structure of a frame is laid out in the appropriate specification, for example a frame usually comprises a header and a payload, and certain fields at specific 'locations' in the frame can inform the recipient, among others, of the type of command being passed. Since the wireless range of the transmitters used in this type of low-power, low cost network is limited, messages can be sent from a sending device to a remote receiving device by using intermediate devices in a manner referred to as 'multi-hop' routing. The further away the target node is located, the greater the number of 'hops' that will be taken to deliver the message. Before sending a message to a destination node (also referred to as target node), a source node (also referred to as initiator node or originator node) must first establish a network path to that target or destination node, i.e. it must first discover the route to the destination node. In a multi-hop network, a source node could connect to a destination node over any number of possible routes. Obviously, a route having a small number of intermediate nodes, and therefore a small number of 'hops', each of them having satisfactory link quality, is preferable over a route with more hops or weaker links. A number of techniques have been developed to assist in determining an optimal route from a source node to a destination node.

Using the current standards, route discovery, performed for example using the technique of AODV (ad-hoc on-demand distance vector) routing, is a very resource consuming task. Route request commands (RREQs) are re-broadcasted by every router within the defined radius (in TCP/IP networks called time-to-live (TTL)) from the source, despite the fact that it may have reached its destination. Furthermore, techniques to increase broadcast reliability, especially used for shared-media-based communication (such as multihop wireless), further increase the number of packets resulting from a single route request. An example is the passive acknowledgement technique used in the ZigBee standard, where a router, after re-broadcasting a RREQ packet, keeps track for a given time whether all its neighbour routers have re-broadcasted it further, and if at least one has not, that router transmits the RREQ packet anew. Furthermore, on reception of the same RREQ packet over a path with a better path cost, the packet must be re-broadcast anew. Obviously, each message will also arrive at a multitude of nodes for which the message is not intended, e.g. the nodes far away from both the source and target node and not located between those nodes. The result is a considerable burst in traffic, referred to as a 'broadcast storm', which may—in large networks—last for several seconds. Because of the limitations in bandwidth and the high level of traffic triggered as a result of a single route discovery request, packets can collide so that requests and replies are not delivered and the request can fail. Even if the route request delivery was successful, collisions or medium occupation resulting from the broadcast storm may prevent the destination's confirmation route reply packet (usually unicasted to the source node along the discovered path) from reaching the source node, so that the route discovery ultimately fails. This may force the initiator node to repeat the whole route discovery procedure, i.e. start with another broadcast storm.

Furthermore, route discovery according to the current standards must be carried out for each source-destination pair independently, i.e. a broadcast storm is triggered each time a node requires a route to one other node. For a node that needs to establish routes to multiple other nodes, this can lead to noticeable delays between an action (e.g. throw a switch in a lighting control network) and the intended reaction (turn on all the lights controlled by this switch). Also, the high level of traffic arising from the broadcast storms not only leads to inefficiency in the route discovery process, but it can also block important application-layer commands so that these need to be issued again.

Obviously, one way to counteract these inefficiencies in route discovery would be to make each device in the network aware of its position in the network tree or mesh or its geographical position and the position(s) of the devices to which it should send its command or data packets. Obviously, such information would change each time a device is moved or replaced. Manual configuration of such position information is impracticable, especially in large networks, where these corrective measures might even need to be carried out on a daily basis, resulting in a high level of maintenance and an unacceptable cost factor. Furthermore, path data would have to be provided or special position-based routing algorithms would have to be used. On the other hand, tree routing mechanisms usually results in too long, and therefore sub-optimal and potentially overloaded routes, and there is no backup possibility if one node on the route (temporarily) fails. The tree routing mechanism implemented by ZigBee is based on the Cskip tree addressing method that limits the possible network topologies and is impracticable for larger networks. Other tree-based routing mechanisms require extensive communication and calculation effort for establishment and maintenance of the overlay tree structure. With the latter, the advantages of the self-organising wireless network—flexibility and ease of use—would effectively be cancelled out. Evidently, tree routing is not a practicable solution.

Therefore, it is an object of the invention to provide a more efficient method of performing route discovery in a multi-hop network while avoiding the problems outlined above.

SUMMARY OF THE INVENTION

To this end, the present invention describes a network interface unit for a node in a wireless multi-hop network, preferably a ZigBee network, comprising a plurality of nodes that can be connected by means of network paths between source nodes and destination nodes, whereby a network path is established from the source node to the destination node, and which network path may pass through a number of intermediate nodes. The network path consists of a number of physical connections between neighbouring nodes (in the following, a network path may also simply be referred to as a 'route'). Usually, in a multihop mesh network, there are several intermediate nodes between a source node and a destination node, but it could also be the case that a source node is a direct neighbour of the destination node so that no intermediate node is required (and thus no route discovery must be performed). The network interface unit according to the invention comprises a multiple route request assembly module for assembling a multiple route request message such that the multiple route request message of a source node includes a plurality of addresses for specific multiple destination nodes to which network paths are to be established. The network interface unit also comprises a transmit unit for transmitting the message to other nodes in the wireless multi-hop network.

From the point of view of route discovery in a network, a node can be a source node at the start of a route, a destination node at the end of a route, or an intermediate node between a source node and a destination node. A source node initiates the route discovery procedure by broadcasting a network-layer command known as a 'route request'. A destination node is the node with the address specified in the route request. An intermediate node is any other node that receives (and re-transmits) the route request message, as a potential node on the route between source and destination. As mentioned above, in state of the art route discovery, a route request is limited to discovering a route to a single destination, so that the network must be flooded at least once for each route that is to be established. Thus, in a large network encompassing hundreds of nodes or more, with several application-layer connections each, there will be thousands of route discovery broadcast storms, thus effectively blocking or severely hampering other traffic in the network. Furthermore, for large networks encompassing hundreds of nodes, a broadcast storm can last several seconds, and if the route discovery to a destination was unsuccessful, for example owing to collisions of the unicast route reply packet with the route request messages still being rebroadcast, or with the broadcast storm from another originator, the whole route discovery procedure may have to be repeated, contributing even more to network unreliability.

With the network interface according to the invention, a route request for a source node contains all the information required for establishing network paths between that node and a plurality of destination nodes, not just one. Using the network interface according to the invention, routes are established from the source node to a plurality of destination nodes using a single route request and therefore only triggering a single broadcast storm, i.e. the network needs only be flooded once. An obvious advantage is the reduced amount of maintenance traffic in the network (one route request broadcast storm instead of many), and thus improved overall network reliability. Another obvious advantage is that considerable time is saved, since a source node can establish routes to several destination nodes with a single request. Any intermediate node that intercepts the route request can react accordingly, as will be described below, when it detects the indication that multiple routes are being requested by the source node. A further possible advantage of the network interface according to the invention is that the nodes can send less packets, thus saving battery power in the case of battery-operated devices. Particularly in the case of a beacon-enabled network, in which the nodes are only active when a message is to be passed, a reduction in traffic made possible by the network interface according to the invention can considerably prolong the life-time of the battery-powered nodes, by allowing them to return to a sleeping or dormant state sooner.

An appropriate method of establishing a network path between a source node and multiple destination nodes in a wireless multi-hop network comprises the steps of assembling a multiple route request message, which multiple route request message includes a plurality of addresses for specific multiple destination nodes to which the network paths are to be established. The method further comprises transmitting the multiple route request message to other nodes in the wireless multi-hop network.

At least some of the nodes, preferably all of the routers of the network, should be capable of performing appropriate handling of multiple route request messages, for example in a suitable multiple request processing module in the network interface.

The dependent claims and the subsequent description disclose particularly advantageous embodiments and features of the invention.

In the following, without restricting the invention in any way, a wireless multi-hop network will be assumed to be a ZigBee network, compliant with the ZigBee 2007 standard, having a ZigBee co-ordinator (ZC), ZigBee routers (ZR), and ZigBee end devices (ZED). Naturally, the invention is in no way limited to only this standard, but could be used with other standards, such as IEEE802.11s or a future development of the ZigBee standard. The terms 'device' and 'node' may also be used interchangeably in the following. Specific terms used in the following, such as names of individual fields in a network packet payload or names of application layer variables will be known to the skilled person familiar with standards such as the ZigBee standard. New terms or fields required by the network interface and method according to the invention are indicated.

In a ZigBee network, route discovery is initiated when an originating device, which can be any of ZC, ZR, issues a route request. ZEDs do not issue route requests but simply send data to their parent, who then originates the route request. However, only ZC and ZR can act as intermediate nodes; ZEDs don't participate in routing and route discovery. A route request is a data packet whose structure is defined by the ZigBee standard. The network interface and method of establishing a network path according to the invention propose adapting the route request packet structure to allow multiple routes to be specified in a single packet payload. The invention proposes adapting the standard Route Request (RREQ) message to include information on multiple destinations in a new 'Multiple Route Request (MREQ)' message. Therefore, in a particularly preferred embodiment of the invention, a previously unused bit (bit 7) of the Command Options field of the network command payload is used to indicate that, in this packet, routes to multiple destinations are being requested.

The invention proposes referring to this bit as the 'multiple route request' indicator bit or flag, 'MR' for short. If the MR bit or flag is set in the CommandOptions field of the network command payload, a network interface receiving this command packet will react accordingly, as will be explained below.

In addition to the newly specified 'multiple route request' indicator bit in the Command Options field of the Multiple Route Request message, the network command payload assembled using the method according to the invention also includes a 'Multiple Requests' field preferably comprising one byte. This new field specifies the number of unicast routes and multicast routes to be discovered. For example, four bits of the 'Multiple Requests' field can be used to indicate how many unicast routes are to be discovered, and the remaining four bits of the 'Multiple Requests' field can indicate that up to 15 multicast routes are to be discovered. The total number of unicast and multicast destinations is ultimately limited by the bounds placed on packet payload size. As laid out in the appropriate standard, a network command payload is limited to a maximum of 81 bytes (if network-layer security is used) and to 99 bytes (if network-layer security is not used). Each unicast destination requires a total of up to twelve bytes—two bytes for the short address, eight bytes for the long address (if known), one byte for path cost, and one byte for the route request ID, while a multicast destination requires 4 bytes (since a long address does not exist for a multicast destination, only the short group address). In a preferred embodiment, a single path cost field could be used for all the multiple route requests, instead of having one path cost field for each destination. In this way, the payload could accommodate more destinations.

Assembly of the payload and packet is triggered by a network layer primitive, which passes the required parameters such as a list of multicast addresses, a list of unicast addresses, the number each of unicast and multicast routes, etc., to a frame assembler module that fills the appropriate fields in the message frame and payload. Then, it creates the appropriate routing table entries for all of the requested destinations. Then, the assembled message is passed to the lower layers for transmission. The assembled message is then transmitted by the transmitting unit of the network interface, via broadcast (or restricted broadcast), into the network.

Evidently, the new Multiple Route Request message according to the invention, also referred to as 'MREQ' in the following, must be correctly interpreted by any intermediate node that receives it. Therefore, in a particularly preferred embodiment of the network interface unit according to the invention, when a multiple route request message is received by an intermediate node and the 'multiple route request' indicator bit is set, a routing table entry for each of the multiple destination nodes and a route discovery table entry for each of the RREQ IDs is generated by that intermediate node for each of the destination node addresses contained in the Multiple Route Request message. These table entries are later used by the intermediate node so that, for example, it can send a reply back to the correct node. The purpose and use of these table entries will be known to a person skilled in the art, are defined by the appropriate standards, and need not be explained in detail here. Note, that for a MREQ frame, a destination of one of the multiple request is simultaneously an intermediate node for the other destinations. Thus, next to creating the route reply message for the RREQ targeted at itself, the node should also create routing table entries and route discovery entries for the other destinations and rebroadcast the command, as any other intermediate node. As an optimization the node can remove itself from the destination list before rebroadcast.

To use the idea of the invention more advantageously, routes to 'important' devices can be discovered proactively. For example, in the case of many-to-one routing, a concentrator such as a bridge or gateway may be 'aware' of infrastructure devices such as a ZigBee Co-ordinator, a binding cache, a network manager, a trust centre, etc. Since these nodes will most likely be of interest to many other nodes in the network, the concentrator can proactively establish routes to all these devices using a single route request.

Some devices may have multiple application-layer connections and thus need to establish multiple network layer connections, for example a ZigBee switch and a plurality of ZigBee devices that are controlled (e.g. activated or deactivated) by that switch. For instance, a light switch cay have application-layer connections to the lamps or luminaires that 'belong' to that switch (typically lamps in the same room), while another—for instance an HVAC (heating, ventilation and air-conditioning) controller cay have application-layer connections to the air conditioning units in several rooms of an office building, etc. Using the method according to the invention, such a switch can quickly discover routes to all its devices. Depending on the number of devices that belong to the switch, i.e. on the number of addresses to be included in the network packet payload, the switch might need one or more Multiple Route Requests.

Evidently, in order to discover routes for all its application-layer connections, the originating device must know the appropriate addresses. Therefore, in a further preferred embodiment of the invention, the network interface of a node in a wireless multi-hop network comprises a configuration interface by means of which that node can be supplied with addresses of other specific nodes with which that node is functionally associated. For example, by means of a suitable interface, digital data in the form of binding information can be downloaded into a memory of the device and stored for later use.

As mentioned in the introduction, a state of the art broadcast storm can fail to succeed in establishing a route between a source node and a destination node because of collisions in the network. Even when a route request manages to arrive at a destination node and this destination node issues a unicast route reply to confirm the route, route discovery can still fail when the route reply message collides with or cannot access the medium due to the route requests that are still being broadcast by other nodes in the network. Therefore, in a particularly preferred embodiment of the invention, the network interface is realised to issue a route reply message to a source node at least twice, so that, in a particularly simple but effective solution, the chances of the route reply successfully arriving at the source node are dramatically increased. Preferably, the repetitions can be temporally separated, as defined for example by a suitable inter-repetition delay value. The number of times that transmission of a message is to be repeated, specified as a suitable variable which may for example be called 'nwkRouteReplyTransmission', can be defined by a repetition count value, for example three or four times. The time interval at which the transmission of a message is to be repeated, specified as a suitable variable which may for example be called 'nwkRouteReplyTimeout', can e.g. be set to 0.5 s.

In a further development of this idea, the network interface unit is preferably realised to issue an initial route reply message after a delay. By waiting a short interval before issuing a route reply, the chances are higher that the broadcast storm will have decreased in intensity (at least on the way back to the route request source), lessening the likelihood of a route reply failing because of collisions or busy medium. The delay value can be a predefined or configurable value, and could be specified by a suitable variable, which, if predefined, for a network interface according to the invention, could have a fixed value or a value dependent on the network size or other network parameters (e.g. maximum number of router children nwkMaxRouters), or dependent on other data available to the node (e.g. the density of routers in its neighborhood). The proposed variable, which might for example be called 'nwkRouteReplyDelay', may be derived from variables already in use that are defined by the ZigBee standard. An example might be a variable that is also used to control procedures such as acknowledge time-out, broadcast retries, retry interval etc. For instance, a fixed value for the nwkRouteReplyDelay variable might be obtained as follows:

nwkRouteReplyDelay=2·nwkPassiveAcktimeout nwkBroadcastRetries whereas a network-dependent value might be given by nwkRouteReplyDelay=nwkMaxDepth·nwkcRREQRetryInterval where the variables nwkPassiveAcktimeout, nwkBroadcastRetries, nwkMaxDepth and the constant nwkcRREQRetryInterval are defined by the ZigBee standard.

Preferably, the network interface comprises a storage medium such as a small memory for storing such data variables. For example, the memory can store the addresses for a plurality of destination nodes and/or a repetition count value for the number of times to repeat transmission of a message, and/or a delay value by which to precede transmission of a route reply message such as a route reply message.

Evidently, the repeated sending of a route reply and/or the delayed sending of a route reply is not restricted to a response to a multiple route request. In fact, these methods could be applied independently of a multiple route request, for example in a state of the art ZigBee multi-hop network which establishes routes using the known (single) route request command. Particularly for such networks, considerable savings in time and energy can be achieved. The likelihood of the network needing to be flooded again because of collisions leading to a failed route request will be considerably lower, and the devices in the multi-hop network are less likely to expend energy in repeated route requests.

Generally, routes are discovered reactively, that is, as they are required. As long as a route has not been broken (which might happen for example when an intermediate node fails), this route can be regarded as valid. Evidently, some or all parts of such a previously established route could be reused by another pair of originating and destination nodes, so that, in a route discovery step for this node pair, the entire network need not be flooded. Therefore, in a further preferred embodiment of the invention, the network interface unit of a node receiving a route request message is realised to issue a route reply message to the source node of the route request when the receiving node is already part of a previously established network path to a destination node specified in the route request. It is therefore no longer necessary for this receiving node to broadcast the route request further, since, using its already established route to the destination node, a complete route will have been discovered between the source node and the destination node. In this way, the broadcast storm can be halted as of this point, so that the route discovery process is effectively shortened.

Another way of reducing the duration of a broadcast storm is by reducing the number of intermediate nodes that retransmit a route request, i.e. by limiting the range of the broadcast storm. Therefore, in a further preferred embodiment of the invention, the network interface unit is realised such that the broadcast radius of a route request message issued by a source node is restricted to a predefined range. The range might be the number of intermediate nodes that retransmit the message, so that, for a broadcast radius of three, for example, a route request can be re-transmitted by three intermediate nodes, i.e. the message makes three 'hops' before the third intermediate node stops its path through the network. In the case that a route fails to be established because the destination node is outside of the broadcast radius, this radius can be extended until a destination node is found and a route is established between the source node and the destination.

A wireless network could comprise devices or nodes with different network interfaces, for example, some of the devices could have network interfaces according to the invention, and the remainder might have state of the art network interfaces. However, in order to make the most of the advantages of the network interface described here, a wireless multi-hop network preferably comprises devices or nodes each of which has a network interface capable of applying the method according to the invention.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 4b shows a multi-hop network diagram of the wireless network of FIG. 4a.

In the drawings, like numbers refer to like objects throughout. Objects in the diagrams are not necessarily drawn to scale.

DETAILED DESCRIPTION OF THE EMBODIMENTS

Figure 1:
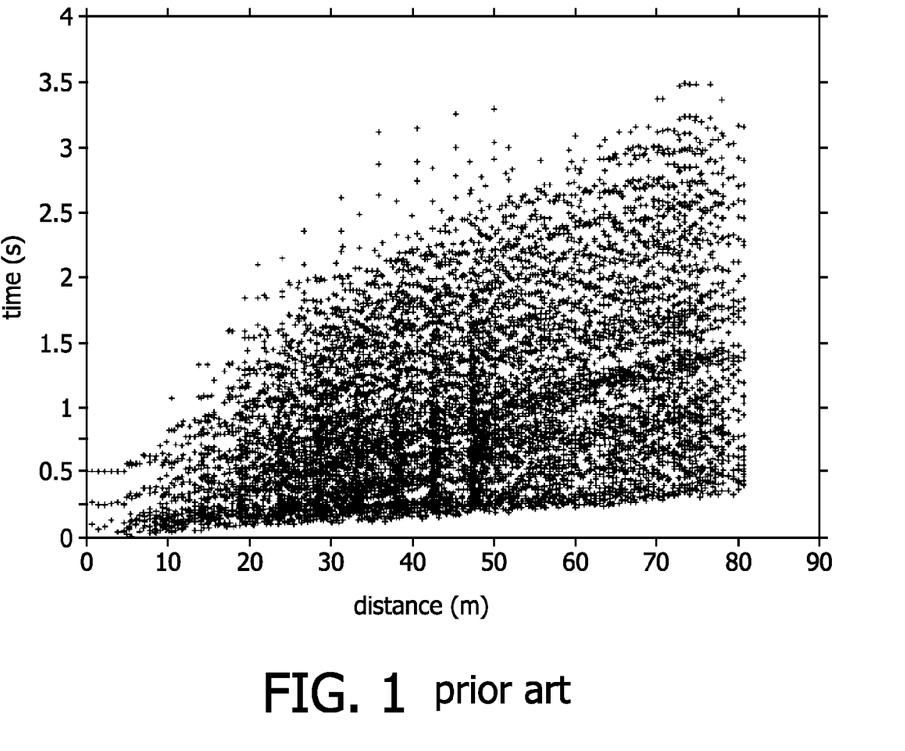
FIG. 1 is a graph illustrating the propagation of a route request command frame in an exemplary prior art network.

The graph of FIG. 1 shows the propagation of a route request (RREQ) message in a prior art network comprising 630 ZR nodes; each '+' indicates a RREQ message broadcasted by a node. The vertical axis indicates the time elapsed between the initial RREQ message issued by the source node and the sending of a RREQ message by a particular node, while the horizontal axis indicates the distance of the particular node from the source node in meters. As the graph shows, broadcast storm increases in intensity until the last nodes, furthest away from the source node, have forwarded the RREQ message. Until these nodes are reached, 3.5 seconds have elapsed. In this time, the network is so flooded by the RREQ message, that other application messages, or even route reply messages for this RREQ, may fail to get through.

Figure 2A:
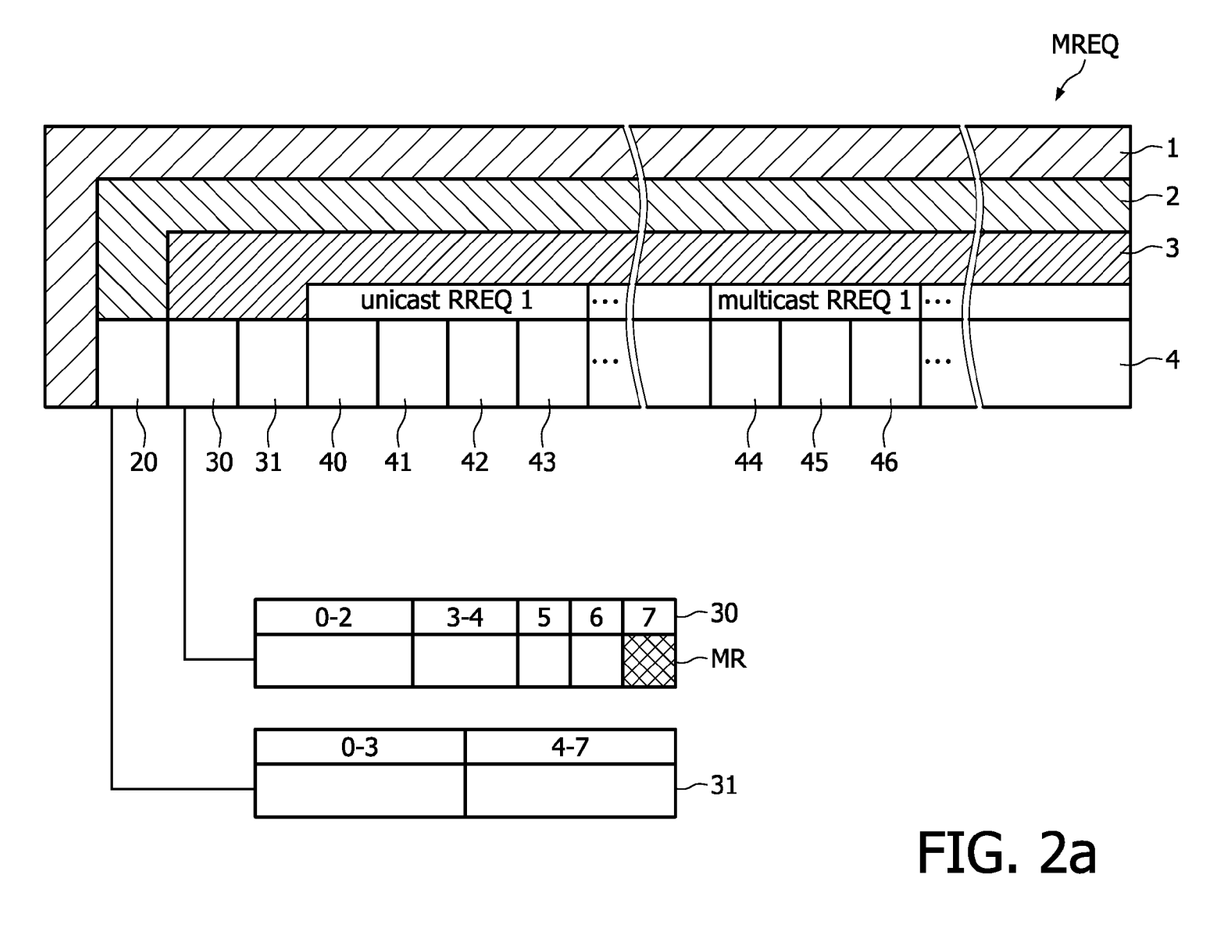
FIG. 2a shows a schematic representation of a ZigBee route request command frame according to a first embodiment of the invention.

FIG. 2a schematically shows the structure of a Multiple Route Request network command MREQ according to a first embodiment of the invention. As mentioned in the introduction, a network command sent from one node to another comprises a network header 1 and a network payload 2, as will be known to a person skilled in the art. A network command frame is assembled by the frame assembler of the network layer in response to the NLME-MULTIROUTE-DISCOVERY.request primitive. The abbreviation 'NLME' stands for 'Network Layer Management Entity' service access point. As will be known to the skilled person, such a primitive specifies the values of the fields or parameters to be used by the layer to which the primitive is sent, in order to process and/or construct the frame. The following is a list of the variables, according to the invention, passed by the primitive to the frame assembler:

```
NLME-MULTIROUTE-DISCOVERY.request    {
    DstAddrMode,
    ListOfMany-to-OneAddresses,
    NoRouteCache,
    ListOfMulticastAdresses,
    ListOfUnicastAddresses,
    Radius
}
``` where DstAddrMode comprises two bytes specifying the kind and number of destination addresses provided. Bits 3-0 specify the number of 16-bit destination addresses for many-to-one route discovery, bits 7-4 specify the number of 16-bit network addresses of multicast groups, bits 11-8 specify the number of 16-bit addresses of individual devices, and bits 15-12 are reserved. The variable ListOfMany-to-OneAddresses contains a list of the many-to-one addresses. The NoRouteCache is a boolean value specifying whether a route record table should be established (TRUE) or not (FALSE) when many-to-one routes are to be discovered. The variables ListOfMulticastAdresses and ListOfUnicastAddresses contain lists of addresses, and the variable Radius is an optional parameter specifying the number of hops to be taken by the route request in the network.

Using the information provided by the primitive, a frame assembler assembles a multiple request message MREQ, with header 1 and payload 2, as indicated in the diagram. For the purposes of illustration, the different functional nested regions 1, 2, 3, 4 are indicated by different shadings. The message header 1 comprises a number of fields supplying, amongst others, control and security information. The payload 2 is indicated by a Command Identifier field 20 of one byte length to indicate that the following content 3 is a command payload 3. The command payload 3 commences with a Command Options field 30 of one byte length followed by a Multiple Requests field 31 of one byte length according to the invention. The contents of the Command Options field 30 and the Multiple Requests field 31 are shown in the lower part of the diagram. The first seven bits, i.e. bits 0-6, of the Command Options field 30 are interpreted in the usual manner in compliance with the ZigBee standard. According to the invention, the final bit, bit 7, of this Command Options field 30 is now used to indicate that the command payload 3 includes multiple requests. The first four bits of the following Multiple Requests field 31 indicate the number of Unicast routes, and the remaining four bits are used to indicate the number of Multicast routes to be discovered with this Multiple Route Request MREQ message. The size of the network frame payload is limited in ZigBee-2007 to a total of 82 bytes, so that the number of unicast and multicast routes that can be discovered using the Multiple Routes Request according to the invention are also limited. Since three bytes are required for network Command Identifier, Command Options, and Multiple Requests fields, 79 bytes of payload remain for unicast/multicast route requests.

The remainder 4 of the payload 2 comprises the request ID, path cost and address information for the Unicast route requests and the Multicast route requests.

In this embodiment, each unicast route request requires a total of twelve bytes, one RREQ identifier byte 40, two destination address bytes 41, one path cost byte 42, and eight Destination IEEE address bytes 43. The pattern of these four fields is repeated for each unicast route to be discovered. Up to six unicast route requests can be accommodated by the payload, requiring a maximum of 72 bytes. Similarly, since each multicast route request requires a total of four bytes (one RREQ identifier byte 44, two destination address bytes 45, and one path cost byte 46), up to 15 multicast route requests, requiring a maximum of 60 bytes, can be accommodated in the payload. The pattern of these three fields is repeated for each multicast route to be discovered. For the sake of clarity, only the fields of the first unicast or multicast requests are numbered in the diagram.

When 'bit 7' of the Command Options field 30 is set, i.e. '1', this informs the intermediate node receiving the packet that the following field 31 is a Multiple Requests field 31. The intermediate node can then generate routing table entries and discovery table entries for each of the unicast and multicast routes to be discovered. In effect, by setting 'bit 7' of the Command Options field 30, the source node informs the intermediate node that the content of the payload is different from the standard Route Request (RREQ) payload, so that the intermediate node will react accordingly.

Figure 2B:
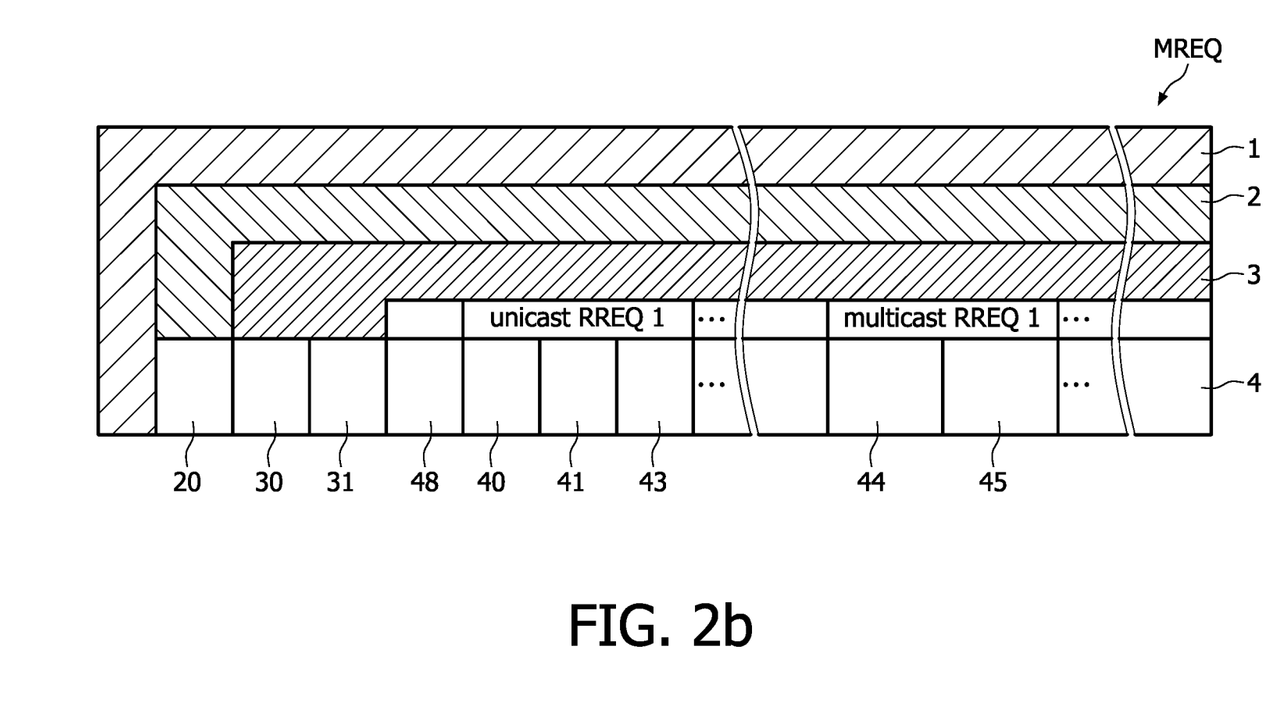
FIG. 2b shows a schematic representation of a ZigBee route request command frame according to a second embodiment of the invention.

As explained above, the size of the network frame payload is limited to a total of 82 bytes, so that the number of routes that can be discovered is also limited. However, in an alternative realization, the total number of routes could be increased. As illustrated in FIG. 2b, the overall structure of the payload remains essentially the same. However, instead of having a dedicated path cost field for each of the unicast route requests and multicast route requests, as was the case for the example of FIG. 2a, a single path cost field 48 could be used. A unicast route request then needs only one RREQ identifier byte 40, two destination address bytes 41, and eight Destination IEEE address bytes 43, while a multicast route request only needs one RREQ identifier byte 44 and two destination address bytes 45. This means that several bytes could be 'saved', allowing one additional unicast route to be discovered. Again, the total number each of unicast and multicast routes to be discovered are specified in the Multiple Requests field 31 as described in FIG. 2a above.

Figure 2C:
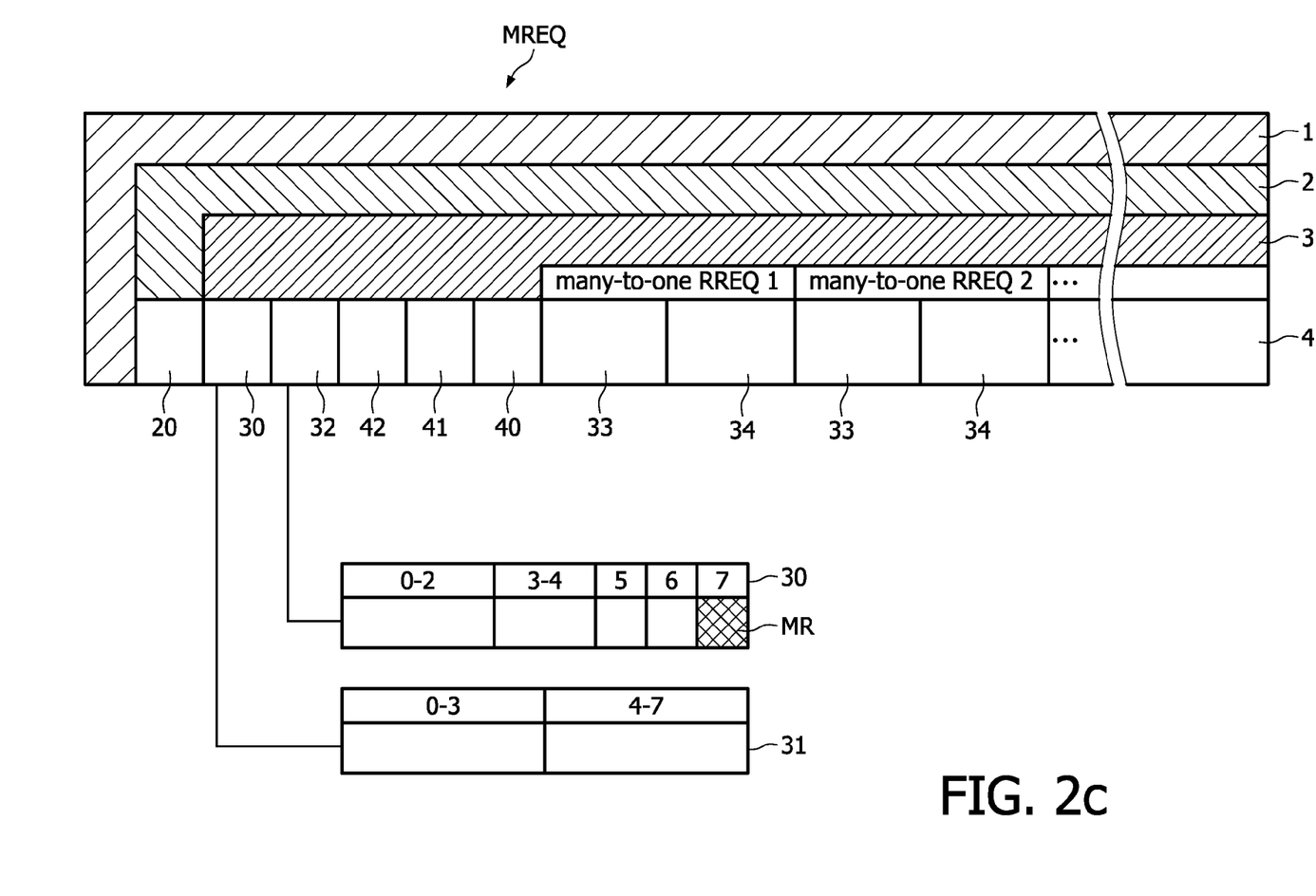
FIG. 2c shows a schematic representation of a ZigBee route request command frame according to a third embodiment of the invention.

The network payload can also be used for many-to-one route discovery using the advantages of the method according to the invention, for example in the case of a gateway device wishing to establish routes in advance to a number of other important devices. The structure of the payload 2 can be seen in FIG. 2c. The third and fourth bits of the Command Option field 30 are set to indicate that many-to-one routing is being performed. The last bit in the Command Options field 30 indicates that multiple requests are to be handled. The first four bits of the following Multiple Requests field 31 now indicate the number of nodes for which many-to-one routes are to be established, while the remaining four bits are unused, the Path Cost field 32 of 1 byte length indicates the cost to the source, i.e. the intended concentrator, while the RREQ identifier field 33 of one byte length, together with the source address in the network header, uniquely identifies the RREQ packet. The rest of the payload is used for the addresses of the desired many-to-one nodes. Again, each route request requires a total of ten bytes, two source address bytes 41, and eight Source IEEE address bytes 42, so that a total of up to seven many-to-one routes can be established in one MREQ message. Again, the pattern of these two fields is repeated for each route to be discovered, and only the first two fields 40, 41 are numbered in the diagram. Many-to-one routes can be established proactively, preferably after the device, for example a concentrator, bridge, gateway etc., has discovered them. On receipt of a MREQ command with multiple many-to-one destinations according to the description above, all the nodes within the range of the concentrator create the routing table entries for each of the multiple many-to-one routing targets.

Figure 3A:
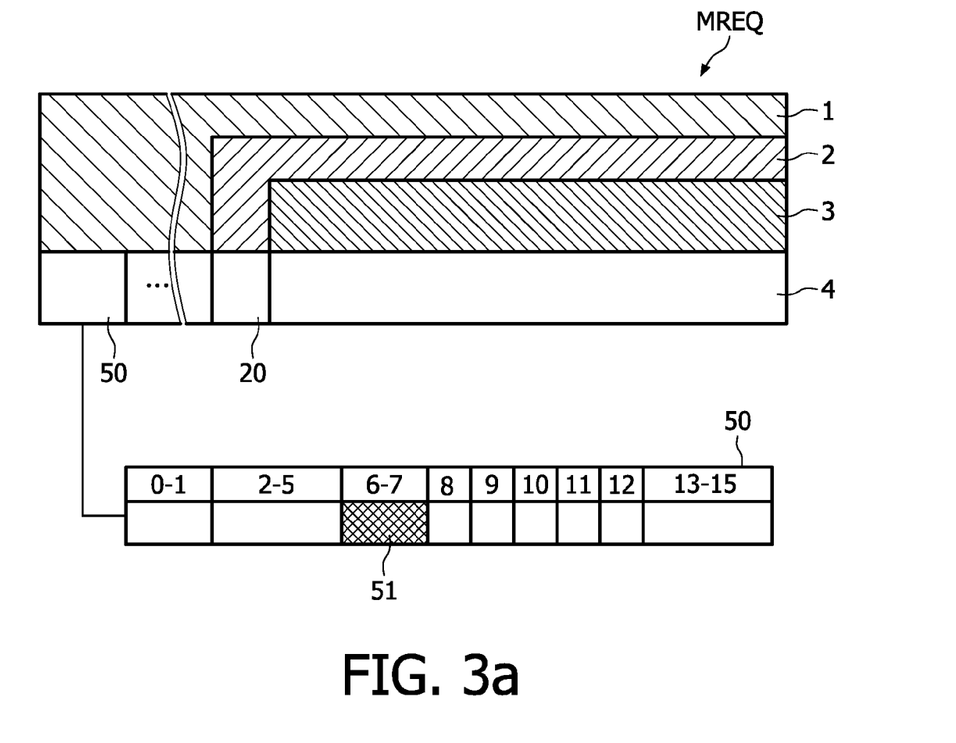
FIG. 3a shows a CommandOptions field of a route request according to a further realisation of the invention.
Figure 3B:
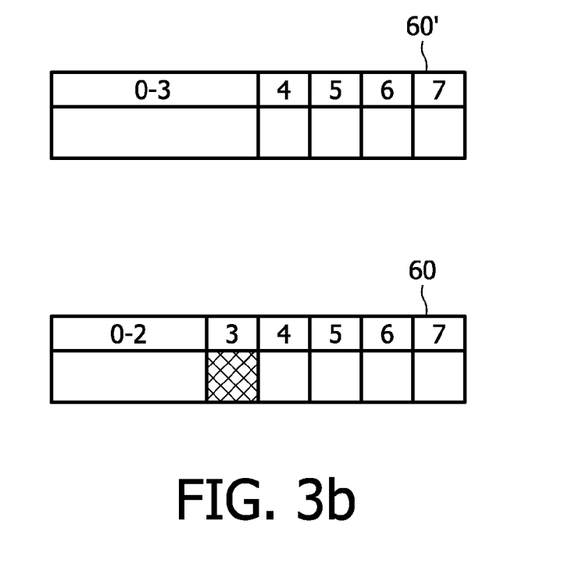
FIG. 3b shows a prior art CommandOptions field of a prior art route reply packet, and a CommandOptions field of a route reply packet according to an embodiment of the invention.

As already explained, the method according to the invention can be applied to reduce the intensity of a broadcast storm by having intermediate nodes, already lying on a route to a desired destination, issue a route reply directly to the source node. The route request need not be broadcast again by these intermediate nodes. To allow such route re-use, in the method according to the invention, the DiscoverRoute flag of the FrameControl field in a route request message (MREQ or even RREQ) is set to '11'. This is shown graphically in FIG. 3a, which shows a route request message MREQ with a FrameControl field 50, comprising two octets, of which bits 6 and 7, when set, indicate that route reuse is desired. The use of these bits in the method according to the invention is indicated by the cross-hatched shading. When these set bits are detected by an intermediate node receiving the route request and which has already has a route to a specified destination, the intermediate node assembles a route reply RREP accordingly. The upper part of FIG. 3b shows a prior art CommandOptions field 60', in which the first four bits 0-3 are reserved. In a CommandOptions field 60 of a route reply assembled according to the invention, shown in the lower part of FIG. 3b, bit 3 is set to indicate that the route proffered by this intermediate node is possibly a sub-optimal route. The use of this bit in the method according to the invention is indicated by the cross-hatched shading.

Figure 4A:
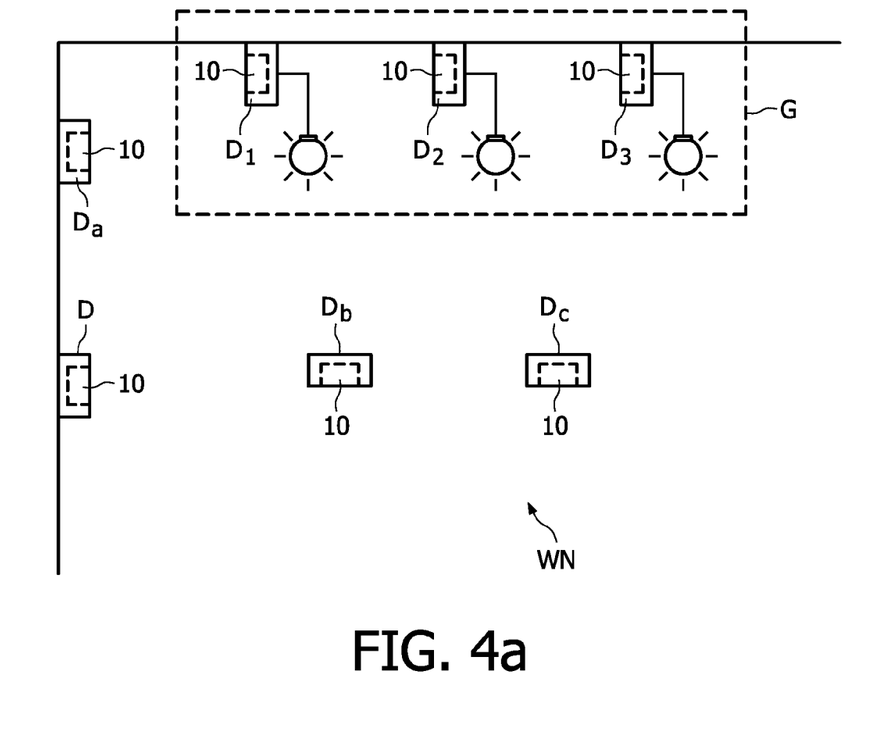
FIG. 4a shows a schematic representation of devices in a wireless multi-hop network according to a possible embodiment of the invention.

FIG. 4a shows a schematic representation of a number of devices D, $D_1$, $D_2$, $D_3$, $D_a$, $D_b$, $D_c$ in a possible arrangement in a wireless network WN. Each device D, $D_1$, $D_2$, $D_3$, $D_a$, $D_b$, $D_c$ has a ZigBee-compliant network interface 10, which allows it to send and receive messages in the wireless multi-hop network WN so that it can exchange information with the other devices D, $D_1$, $D_2$, $D_3$, $D_a$, $D_b$, $D_c$. In this example, the device D is a switch in the form of a motion sensor or any presence detector which can detect the presence of a person in the room and which can control the luminaires $D_1$, $D_2$, $D_3$. These luminaires $D_1$, $D_2$, $D_3$ comprise a functional multicast group G and have a group address. Other devices $D_a$, $D_b$, $D_c$ in the wireless network can be light sensors, thermostats, ventilators, etc. For the sake of simplicity, the luminaires $D_1$, $D_2$, $D_3$ and the switch D may be assumed to be in the same room, but the other devices could be arranged anywhere. This example is purposefully kept simple, and the skilled person will be aware that a wireless multi-hop network can comprise hundreds or even thousands of nodes or devices.

Figure 4B:
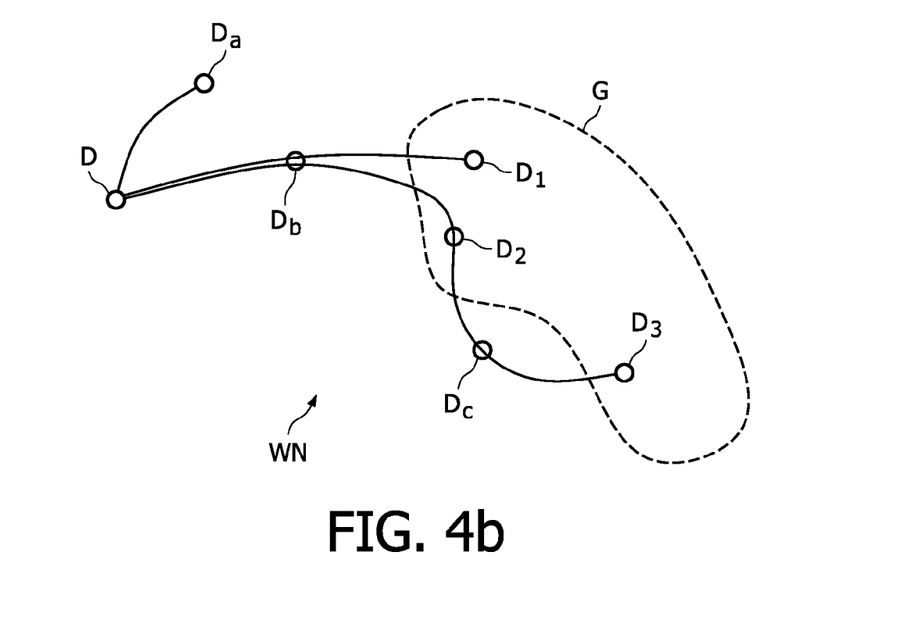

FIG. 4b shows a multi-hop network diagram for the wireless network of FIG. 4a. This diagram shows the established network paths or routes between the devices D, $D_1$, $D_2$, $D_3$, $D_a$, $D_b$, $D_c$. In this one scenario, the switch D (the presence detector) has established network paths to the group G (the luminaires) which it controls, and to another devices $D_a$ and $D_c$ (a HVAC device). The luminaires $D_1$, $D_2$, $D_3$ and the HVAC device $D_c$ are not directly in the range of the switch D; the route from D to the group members of G passes through $D_b$, to the closest group member $D_1$, by which it is transmitted in member-mode multicast to $D_2$ and $D_3$; while the route from D to $D_a$ is direct, and the route from D to $D_c$ goes via $D_b$ and $D_2$. In a prior art route discovery procedure, to establish these routes, the source node D would have to flood the network WN with a route request (RREQ) two times in succession, once for each of the destinations G, $D_b$ and $D_a$. In the method according to the invention, the source node D can assemble a multiple route request message with two unicast addresses (for the devices $D_b$ and $D_a$) and one multicast address for the luminaire group G comprising the devices $D_1$, $D_2$, $D_3$.

Figure 5:
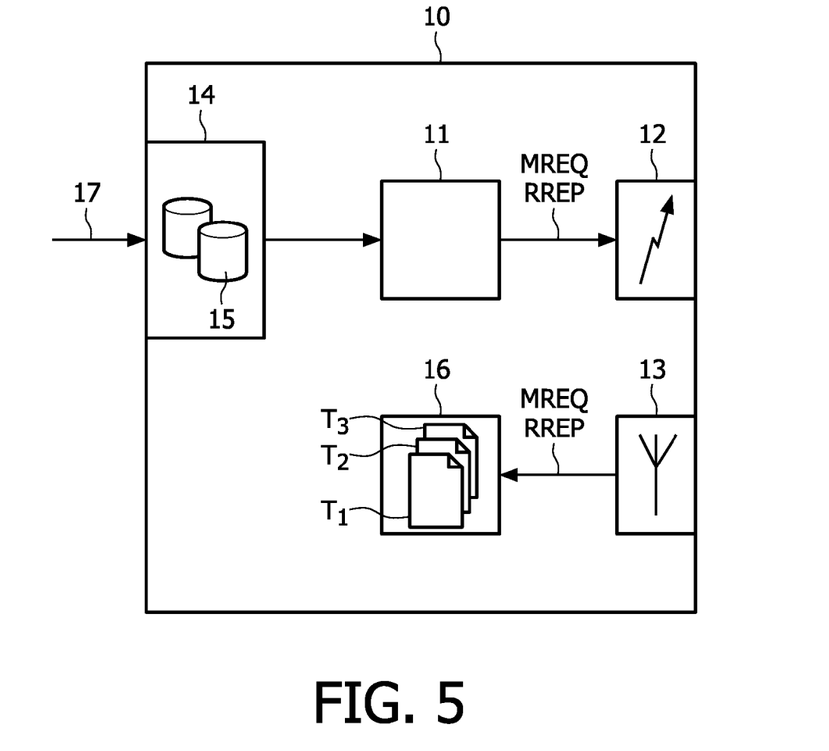
FIG. 5 shows a block diagram of a network interface according to an embodiment of the invention.

A very simplified block diagram of a network interface 10 according to the invention is shown in FIG. 5. It must be stressed that only those blocks or units pertinent to this description are indicated, and a person skilled in the art will be aware of any other modules or units that are required for a properly functional network interface. Here, a frame assembly unit 11 can assemble a frame, for instance a multiple route request MREQ or a route reply RREP, depending on the action being carried out by the node in which the network interface 10 is incorporated. A configuration interface 14 allows the network interface 10 of a device to be configured, for example in a commissioning step, to include address information for devices to which this node will be bound. For example, a light switch can be bound to the lamps or luminaires that it will activate. A memory 15, shown here as part of the configuration interface 14 but which can be realised separately, can store such information such as device addresses, as well as other parameters such as a repeat count value and a delay value for the sending of a route reply message. When the node in which the network interface is incorporated is acting as a source node and wishes to establish routes to the destinations whose addresses are stored in the memory 15, the addresses are retrieved from the memory, and the frame assembly module assembles a multiple request message MREQ, which is then broadcast in the wireless network via the transmit interface 12. As explained above using FIG. 2a, the multiple route request message is characterised by the set or valid Multiple Requests bit MR in the CommandOptions field of the frame.

An intermediate node in the network, also having a network interface 10, detects a frame by means of a receive interface 13, and commences to decode the fields of the frame in a decoding unit 16. When it detects the presence of the valid MR bit, it knows that a multiple route request message is being received, and proceeds to determine how many unicast and/or multicast routes are to be established by means of the MultipleRequests field, and, using this information, generates table entries $T_1$, $T_2$, $T_3$, for example routing table entries and route discovery table entries, for these destinations. This information can be used at a later point by the intermediate node when passing frames between the source node and a destination node, as will be known to a person skilled in the art. Evidently, the transmitter 12 and receiver 13, shown for sake of clarity as separate entities in the diagram, could be realised as a combined transceiver module.

A node that is itself a destination node specified in the multiple route request MREQ will compile a route reply message RREP. This route reply can be issued as many times as specified by a value stored in the memory 15, and can be delayed before transmission, again according to a value stored in the memory. If no such values have been stored, the route reply RREP can simply be sent once, in the usual manner.

Furthermore, the destination node shall retransmit the MREQ, possibly after deleting its own address from the list of destinations and then only if there are any destination addresses left in the list. The subsequent behaviour of the originating, intermediate and destination nodes will be known to a person skilled in the art, and need not be further dealt with at this point.

Figure 6:
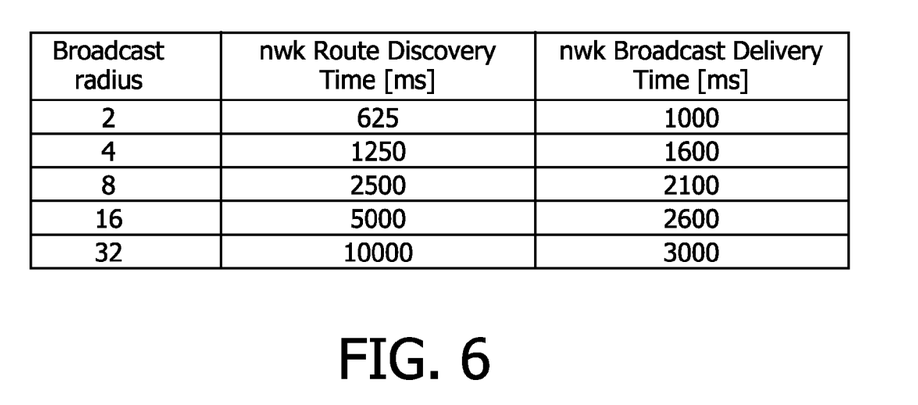
FIG. 6 shows a table of broadcast radius values with associated route discovery and broadcast delivery parameter values for use in a method according to an embodiment of the invention.

Any of the above techniques can further be combined with the other variation of the method according to the invention, namely the application of a restricted broadcast radius to limit the extent of the broadcast storm. FIG. 6 shows a table of broadcast radius values with associated route discovery and broadcast delivery parameter values. A network interface according to the invention in an originating device can select a low broadcast radius, for example 2, so that the route request is only forwarded for two 'hops'. With a low value of broadcast radius, the time for a reply can also be expected to be shorter, so that time-related parameters 'nwkcRouteDiscoveryTime' and 'nwkBroadcastDeliveryTime', which specify respectively the time an originator node and intermediate nodes should keep the route discovery entries waiting for a RREP packet to be received and the time an entry corresponding to particular broadcast packet is kept in the broadcast transaction table (BTT) to avoid duplicates, are assigned values in keeping with the corresponding broadcast radius value. If this low broadcast radius is not sufficient, i.e. the source node receives no route reply within the given time specified by the corresponding parameter, the broadcast radius, i.e. the number of hops, can be increased. If necessary, the broadcast radius can be successively increased until route discovery succeeds and a route reply is received from each of the destination nodes.

By applying the methods according to the invention, as described herein, the time required to establish routes to multiple destinations can thus be drastically reduced, a flooding of the entire network can be avoided, and a more reliable confirmation of the route discovery procedure is possible, all with a minimum of effort.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A network interface unit (10) for a node (D, $D_1$, $D_2$, $D_3$, $D_a$, $D_b$, $D_c$) in a wireless multi-hop network (WN) comprising a plurality of nodes (D, $D_1$, $D_2$, $D_3$, $D_a$, $D_b$, $D_c$) that can be connected by means of network paths between source nodes and destination nodes, which network interface unit (10) comprises a multiple route request assembly module (11) for assembling a multiple route request message (MREQ) such that the multiple route request message (MREQ) of a source node (D) includes a plurality of addresses (41, 43, 45) for specific multiple destination nodes ($D_1$, $D_2$, $D_3$) to which network paths are to be established; wherein said multiple route request assembly module is configured to assemble a multiple route request message (MREQ) to comprise a single multiple route request indicator (MR) to indicate that network paths are desired between the source node (D) and multiple destinations (D1, D2, D3) in the wireless multi-hop network (WN), which multiple route request indicator (MR) consisting of a single bit of the multiple route request message (MREQ);

a transmit unit (12) for transmitting the message (MREQ) to other nodes ($D_1$, $D_2$, $D_3$, $D_a$, $D_b$, $D_c$) in the wireless multi-hop network (WN); and, a decoding unit (16) for, as the multiple route request indicator (MR) in the multiple route request (MREQ) is detected by each receiving intermediate node (Db), a table entry (T1, T2, T3) for each of the multiple destination nodes (D1, D2, D3) is created by each said receiving intermediate node (D2, Db, Dc) on the basis of the destination node addresses (41, 43, 45) contained in the multiple route request message (MREQ).

2. A network interface unit (10) according to claim 1, comprising a configuration interface (14) for obtaining addresses (41, 43, 45) of other specific nodes ($D_1$, $D_2$, $D_3$) in the wireless multi-hop network (WN).

3. A network interface unit (10) according to claim 1, which network interface unit (10) is realised to issue a route reply message (RREP) to a source node (D) at least twice.

4. A network interface unit (10) according to claim 1, which network interface unit (10) is realised to issue a route reply message (RREP) after a delay according to a delay value.

5. A network interface unit (10) according to claim 1, comprising a storage medium (15) for storing
addresses (41, 43, 45) for a plurality of destination nodes ($D_1$, $D_2$, $D_3$);
and/or a repetition count value for the number of times to repeat transmission of a route reply message (RREP);
and/or a delay value by which to precede transmission of a route reply message (RREP).

6. A network interface unit (10) according to claim 1, which network interface unit (10) of a node ($D_2$, $D_b$, $D_c$) is realised to issue a route reply message (RREP) to the source node (D) when that node ($D_2$, $D_b$, $D_c$) lies on a previously established route to a destination node ($D_1$, $D_2$, $D_3$).

7. A network interface unit (10) according to claim 1, which network interface unit (10) is realised such that the broadcast radius of a route request message (MREQ) issued by a source node (D) is restricted to a predefined range.

8. A wireless multi-hop network (WN) comprising a plurality of nodes (D, $D_1$, $D_2$, $D_3$, $D_a$, $D_b$, $D_c$) with network interface units (10) according to claim 1.

9. A method of establishing a network path between a source node (D) and multiple destination nodes ($D_1$, $D_2$, $D_3$) in a wireless multi-hop network (WN), which method comprises the steps of assembling a multiple route request message (MREQ) by the source node, which multiple route request message (MREQ) comprises:
a plurality of addresses (41, 43, 45) for specific multiple destination nodes (D1, D2, D3) to which the network paths are to be established, and
a single multiple route request indicator (MR) to indicate that network paths are desired between the source node (D) and multiple destinations (D1, D2, D3) in the wireless multi-hop network (WN), the multiple route request indicator (MR) consisting of a single bit of the multiple route request message (MREQ);

transmitting the multiple route request message (MREQ) to other nodes (D1, D2, D3, Da, Db, Dc) in the wireless multi-hop network (WN); and, upon receipt of a multiple route request message (MREQ) by each receiving intermediate node (D2, Db, Dc) between the source node (D) and a destination node (D1, D2, D3), each said receiving intermediate node (D2, Db, Dc) creates a table entry (T1, T2, T3) for each of the multiple destination nodes (D1, D2, D3) specified in the multiple route request message (MREQ).

10. A method according to claim 9, wherein the addresses (41, 43, 45) for the specific multiple destinations ($D_1$, $D_2$, $D_3$) are provided to the source node (D) by means of a configuration interface (14).

* * * * *